(12) United States Patent
Yuh

(10) Patent No.: US 7,559,782 B2
(45) Date of Patent: Jul. 14, 2009

(54) STORAGE DEVICE BOX

(75) Inventor: Yi-Fan Yuh, Taipei Hsien (TW)

(73) Assignee: Datastore Technology Co., Ltd., Taipei Hsien (TW)

( * ) Notice: Subject to any disclaimer, the term of this patent is extended or adjusted under 35 U.S.C. 154(b) by 34 days.

(21) Appl. No.: 11/851,770

(22) Filed: Sep. 7, 2007

(65) Prior Publication Data

US 2008/0093959 A1 Apr. 24, 2008

(30) Foreign Application Priority Data

Oct. 20, 2006 (TW) .............................. 95218581 U

(51) Int. Cl.
*H01R 13/62* (2006.01)
(52) U.S. Cl. ...................... 439/160; 361/754
(58) Field of Classification Search ................. 439/159, 439/160, 155, 153; 361/729, 754
See application file for complete search history.

(56) References Cited

U.S. PATENT DOCUMENTS

| 4,914,552 | A | * | 4/1990 | Kecmer ....................... 361/801 |
| 5,644,470 | A | * | 7/1997 | Benedict et al. ............. 361/686 |
| 6,128,196 | A | * | 10/2000 | Hoyle et al. ................. 361/752 |
| 6,419,508 | B2 | * | 7/2002 | Hashimoto .................. 439/159 |
| 6,625,039 | B2 | * | 9/2003 | Barringer et al. ............. 361/800 |
| 6,798,650 | B2 | * | 9/2004 | Reznikov et al. ............ 361/685 |

* cited by examiner

*Primary Examiner*—Neil Abrams
*Assistant Examiner*—Phuong Nguyen
(74) *Attorney, Agent, or Firm*—Leong C. Lei

(57) ABSTRACT

A storage device box includes a casing unit, a releasing unit, and a cover. The casing unit has a front opening. The releasing unit extends movably into the casing unit through the front opening and is movable relative to the casing unit in the longitudinal direction. The cover is coupled pivotably to the releasing unit for covering and uncovering the front opening in the casing unit, and is co-movable with the releasing unit relative to the casing unit in the longitudinal direction.

12 Claims, 8 Drawing Sheets

STORAGE DEVICE BOX

CROSS-REFERENCE TO RELATED APPLICATION

This application claims priority of Taiwanese application no. 095218581, filed on Oct. 20, 2006.

BACKGROUND OF THE INVENTION

1. Field of the Invention

The invention relates to a storage device box, more particularly to a storage device box that permits speedy installation and removal of a storage device therein.

2. Description of the Related Art

Disk drive boxes that permit removable installation of disk drives are well known in the art. One such conventional disk drive box is disclosed in Taiwanese Patent Application No. 94708011. As shown in FIGS. 1 and 2, the conventional disk drive box includes a casing 9, an electrical connector 94, a cover 95, and a releasing unit 93.

The casing 9 includes a tray 91 and a frame 92. The tray 91 of the casing 9 defines an accommodating space 910. The frame 92 of the casing 9 is fastened to the tray 91, and defines a front opening (not shown) that is in spatial communication with the accommodating space 910 in the tray 91.

The electrical connector 94 is mounted on the tray 91, and is coupled electrically to a terminal (not shown) of a disk drive 100 when the disk drive 100 is received in the accommodating space 910 in the tray 91.

The cover 95 is operable so as to cover and uncover the front opening in the frame 92, and has a pivot end portion 951 that is coupled pivotably to the frame 92, and a free end portion 952 that is opposite to the pivot end portion 951 thereof.

The releasing unit 93 includes first, second, and third releasing members 931, 932, 933, and a pushing member 934. The first releasing member 931 is coupled pivotably to the pivot end portion 951 of the cover 95. The second releasing member 932 is coupled pivotably to the first releasing member 931 and is coupled slidably to a lateral wall 911 of the tray 91. The third releasing member 933 is coupled pivotably to the second releasing member 932. The pushing member 934 extends into the accommodating space 910 in the tray 91 through the lateral wall 911 of the tray 91, and has a pivot end 9341 that is coupled pivotably to the third releasing member 933, and a free end 9342 that is disposed in the accommodating space 910 in the tray 91.

In use, when the cover 95 is operated to cover the front opening in the frame 92, this results in corresponding relative rotations of the first, second, and third releasing members 931, 932, 933, and the pushing member 934 such that the free end 9342 of the pushing member 934 moves in a direction away from the front opening in the frame 92, as best shown in FIG. 1. On the other hand, when the cover 95 is operated to uncover the front opening in the frame 92, this results in corresponding relative rotations of the first, second, and third releasing members 931, 932, 933, and the pushing member 934 such that the free end 9342 of the pushing member 934 moves in a direction toward the front opening in the frame 92, as best shown in FIG. 2.

Although the aforementioned conventional disk drive box achieves its intended purpose, the releasing unit 93 thereof is complicated in structure.

SUMMARY OF THE INVENTION

Therefore, the object of the present invention is to provide a storage device box that includes a releasing unit, which has a relatively simple structure.

According to the present invention, a storage device box for mounting removably a storage device comprises a casing unit, a releasing unit, and a cover. The casing unit has front and rear openings that are opposite to each other in a longitudinal direction. The releasing unit extends movably into the casing unit through the front opening in the casing unit, and movable relative to the casing unit in the longitudinal direction. The cover is coupled pivotably to the releasing unit for covering and uncovering the front opening in the casing unit, and is co-movable with the releasing unit relative to the casing unit in the longitudinal direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
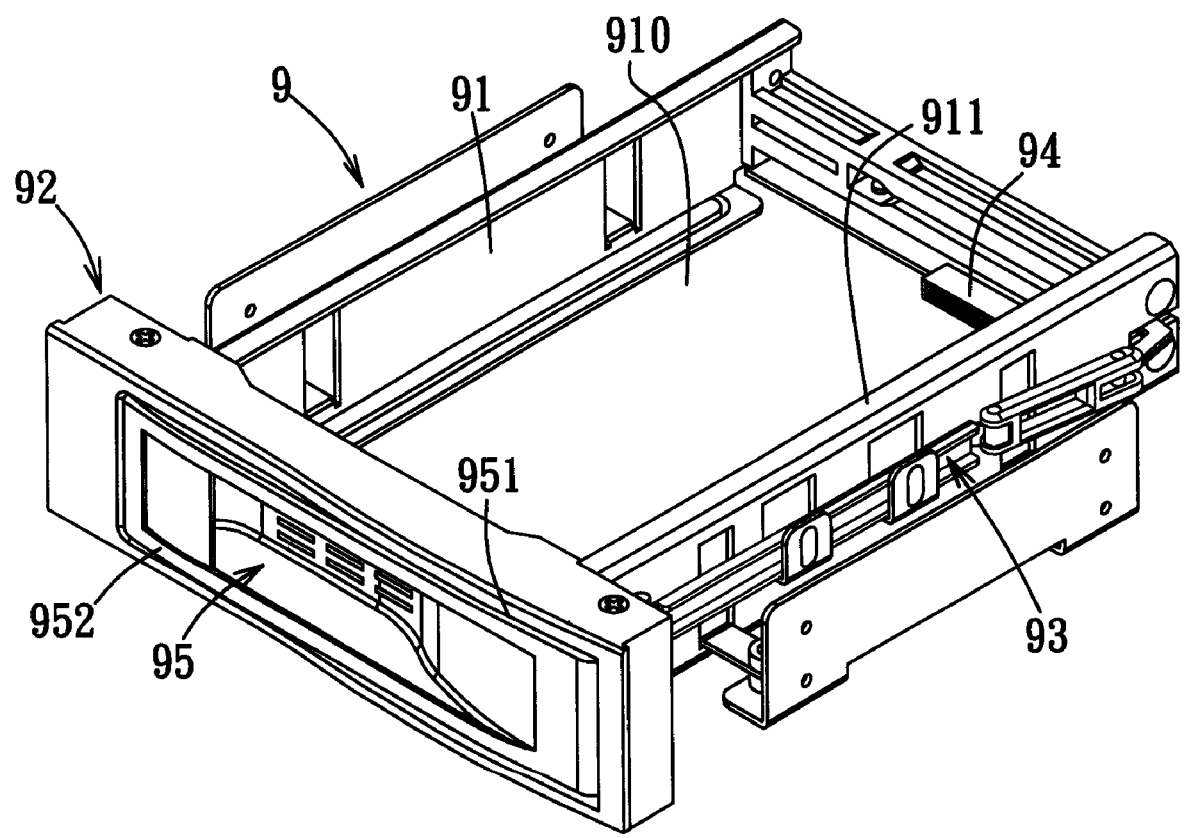
FIG. 1 is a perspective view of a conventional disk drive box.
Figure 2:
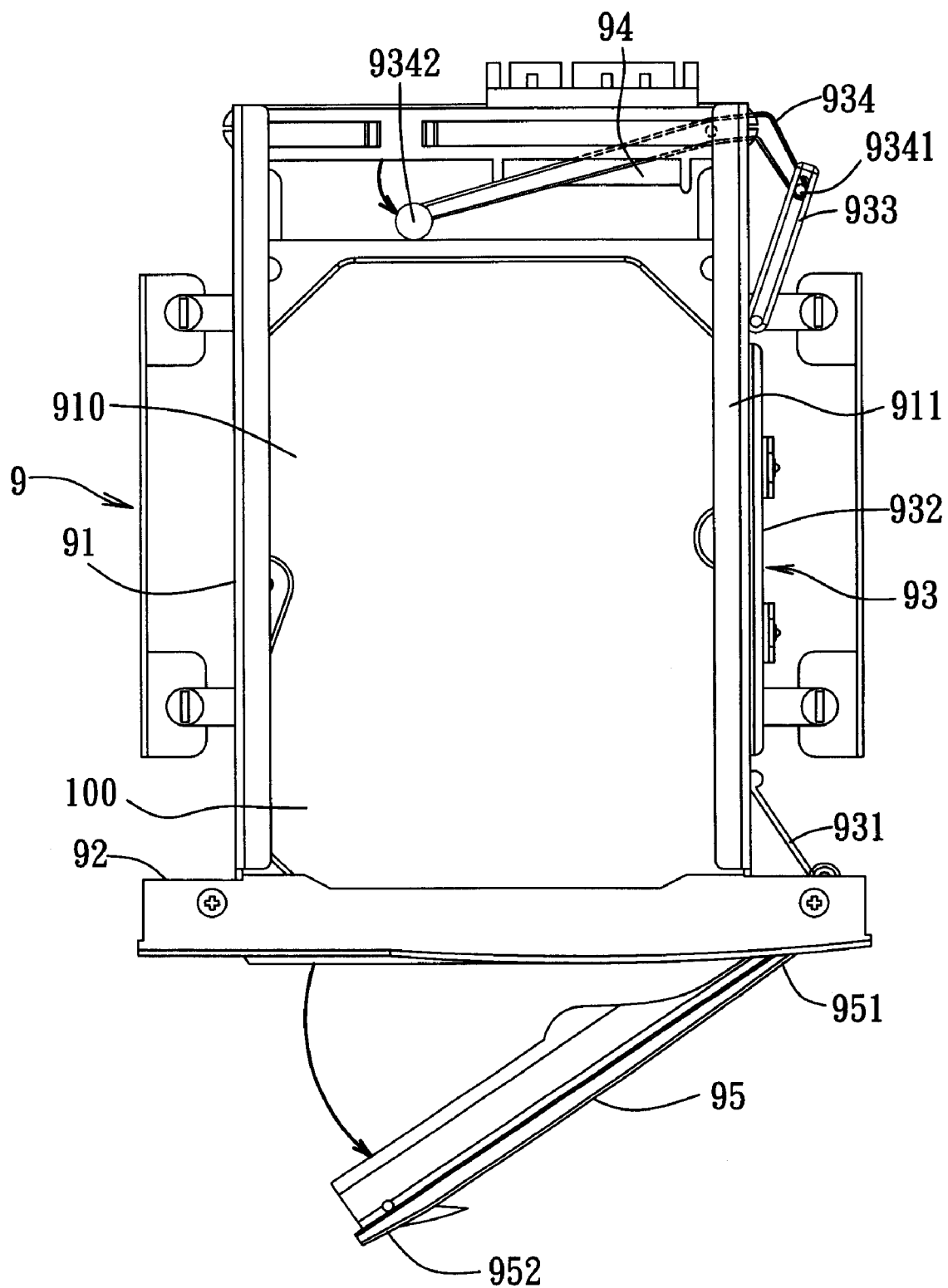
FIG. 2 is a schematic view to illustrate operation of the conventional disk drive box for removing a disk drive therefrom.

Before the present invention is described in greater detail, it should be noted that like elements are denoted by the same reference numerals throughout the disclosure.

Figure 3:
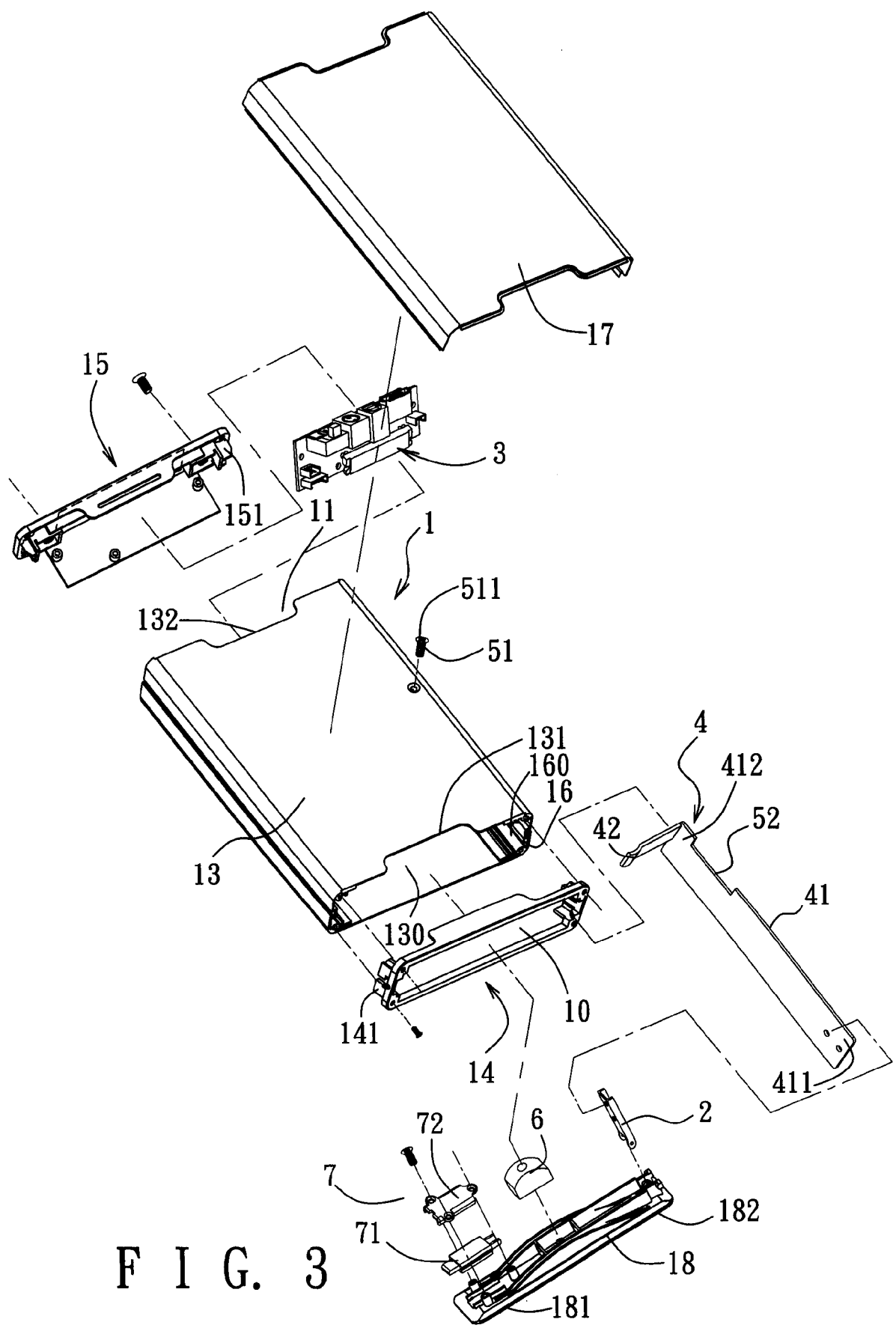
FIG. 3 is an exploded perspective view of the first preferred embodiment of a storage device box according to the present invention.

Referring to FIG. 3, the first preferred embodiment of a storage device box according to this invention is shown to include a casing unit 1, a releasing unit 4, and a front cover 18.

The storage device box of this embodiment is applicable for installing removably a storage device, such as a disk drive, therein, in a manner that will be described hereinafter.

The casing unit 1 includes a casing 13 and a frame 14. The casing 13 of the casing unit 1 includes opposite left and right walls and opposite top and bottom walls that cooperatively define an accommodating space 130, and has front and rear ends 131, 132 that are opposite to each other in a longitudinal direction. The rear end 132 of the casing 13 of the casing unit 1 defines a rear opening 11 that is in spatial communication with the accommodating space 130. The frame 14 of the casing unit 1 is mounted on the front end 131 of the casing 13.

In particular, the frame 14 is provided with a first latching unit 141 that engages and is fastened to the left and right walls of the casing 13. In this embodiment, the frame 14 of the casing unit 1 defines a front opening 10 that is in spatial communication with the accommodating space 130 in the casing 13.

The storage device box further includes a guide rail 16 disposed in the accommodating space 130 in the casing 13 of the casing unit 1, provided on the right wall of the casing 13 of the casing unit 1, and formed with a rail groove 160.

Figure 4:
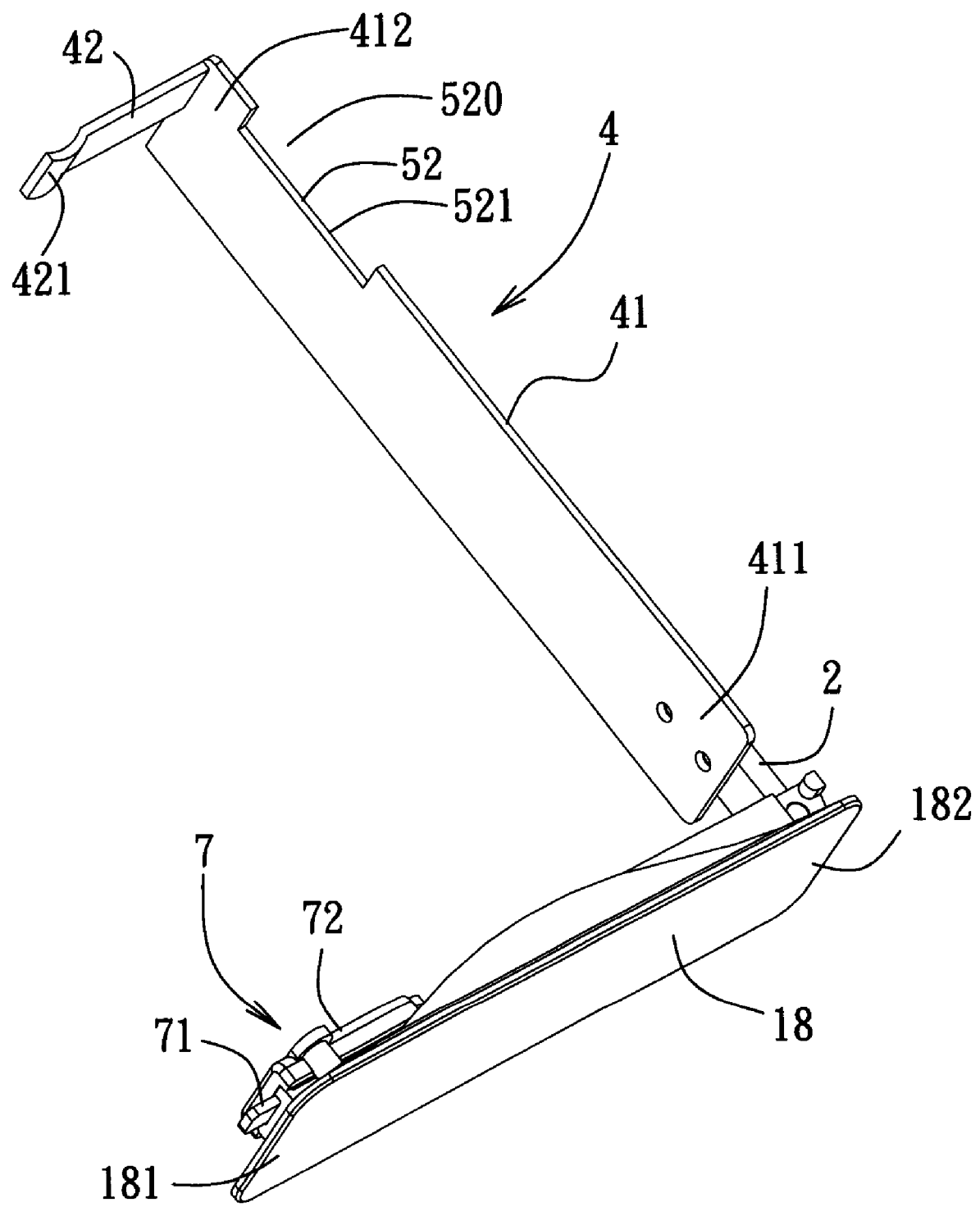
FIG. 4 is a perspective view to illustrate a releasing unit and a cover of the first preferred embodiment.

With further reference to FIG. 4, the releasing unit 4 extends movably into the accommodating space 130 in the casing 13 of the casing unit 1 through the front opening 10 in the frame 14 of the casing unit 1. In this embodiment, the releasing unit 4 includes a releasing member 41 and a pushing member 42. The releasing member 41 of the releasing unit 4 extends in a longitudinal direction, is received slidably in the rail groove 160 in the guide rail 16, and has opposite first and second ends 411, 412 that are respectively distal from and proximate to the rear opening 11 in the casing unit 1. The pushing member 42 of the releasing unit 4 is disposed in the accommodating space 130 in the casing 13 of the casing unit 1, is provided on the second end 412 of the releasing member 41, and extends in a direction transverse to the longitudinal direction. In this embodiment, the pushing member 42 has a protruding portion 421 that protrudes toward the front opening 10 in the frame 14 of the casing unit 1.

The releasing unit 4 is movable relative to the casing unit 1 in the longitudinal direction between a first position, where the pushing member 42 is disposed distal from the front opening 10 in the frame 14 of the casing unit 1, and a second position, where the pushing member 42 is disposed proximate to (or at least more proximate to) the front opening 10 in the frame 14 of the casing unit 1.

The front cover 18 is coupled pivotably to the first end 411 of the releasing member 41 of the releasing unit 4 for covering and uncovering the front opening 10 in the frame 14 of the casing unit 1. In particular, the storage device box further includes a coupler 2 connected fixedly to the first end 411 of the releasing member 41 of the releasing unit 4. The front cover 18 is disposed externally of the casing unit 1, and has free end portion 181, and a pivot end portion 182 that is opposite to the free end portion 181 and that is connected pivotably to the coupler 2. In this embodiment, the front cover 18 is pivotable relative to the releasing member 41 of the releasing unit 4 between a closed position, where the front cover 18 covers the front opening 10 in the frame 14 of the casing unit 1, and an open position, where the front cover 18 uncovers the front opening 10 in the frame 14 of the casing unit 1.

It is noted that when the front cover 18 is disposed at the closed position, the front cover 18 extends in a direction transverse to the longitudinal direction. On the other hand, when the front cover 18 is disposed at the open position, the front cover 18 extends in the longitudinal direction and aligns with the releasing member 41 of the releasing unit 4.

In addition, the front cover 18 is co-movable with the releasing unit 4 relative to the casing unit 1 in the longitudinal direction. That is, the front cover 18 is movable in the longitudinal direction toward and away from the casing unit 1 so as to dispose the releasing unit 4 at the first and second positions, respectively.

The storage device box further includes a resilient padding 6 that is provided on the front cover 18, and that extends into the front opening 10 in the frame 14 of the casing unit 1 when the front cover 18 is disposed at the closed position.

The storage device box further includes a rear cover 15 that is mounted on the rear end 132 of the casing 13 of the casing unit 1 and that covers the rear opening 11 in the casing 13 of the casing unit 1. In particular, the rear cover 15 is provided with a second latching unit 151 that engages and is fastened to the left and right walls of the casing 13.

The storage device box further includes an electrical connector 3 mounted on the rear cover 15, and coupled electrically to a terminal (not shown) of a storage device 8 (see FIG. 5) when the storage device 8 is received in the accommodating space 130 in the casing 13 of the casing unit 1.

Figure 5:
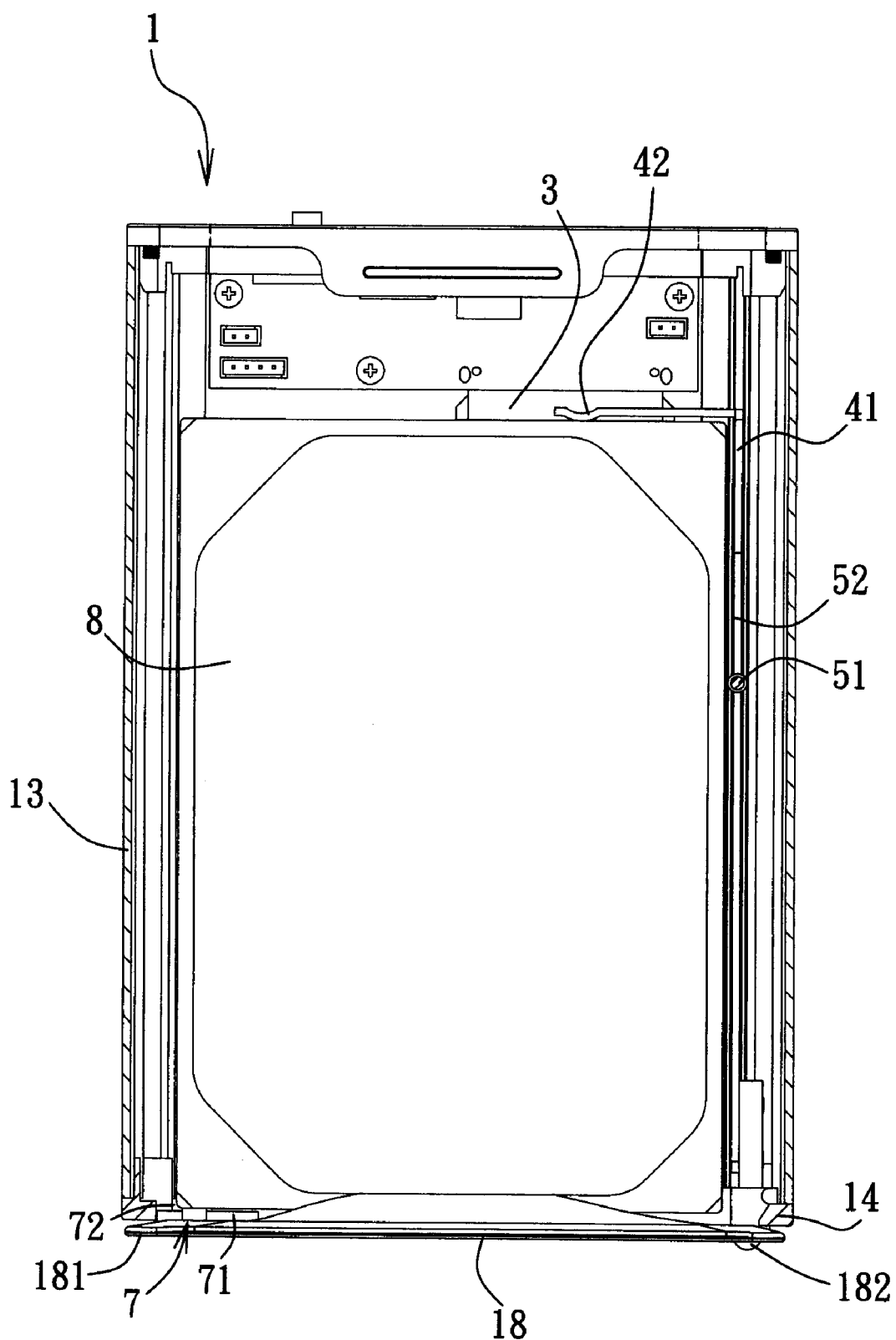
FIG. 5 is a schematic view of the first preferred embodiment, shown in a state with a storage device installed therein.
Figure 6:
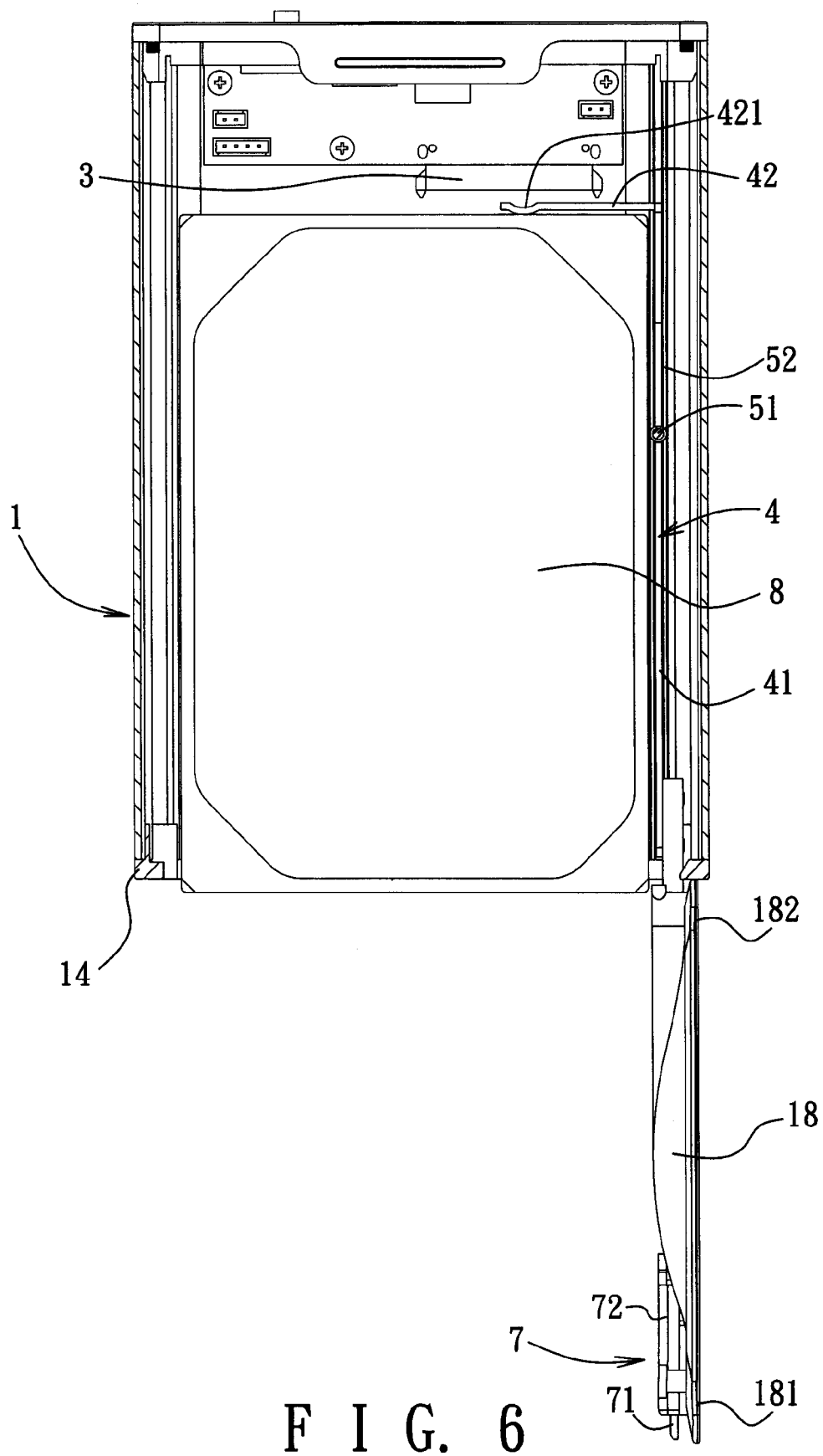
FIGS. 6 and 7 are schematic views to illustrate operation of the first preferred embodiment for removing the storage device therefrom.
Figure 7:
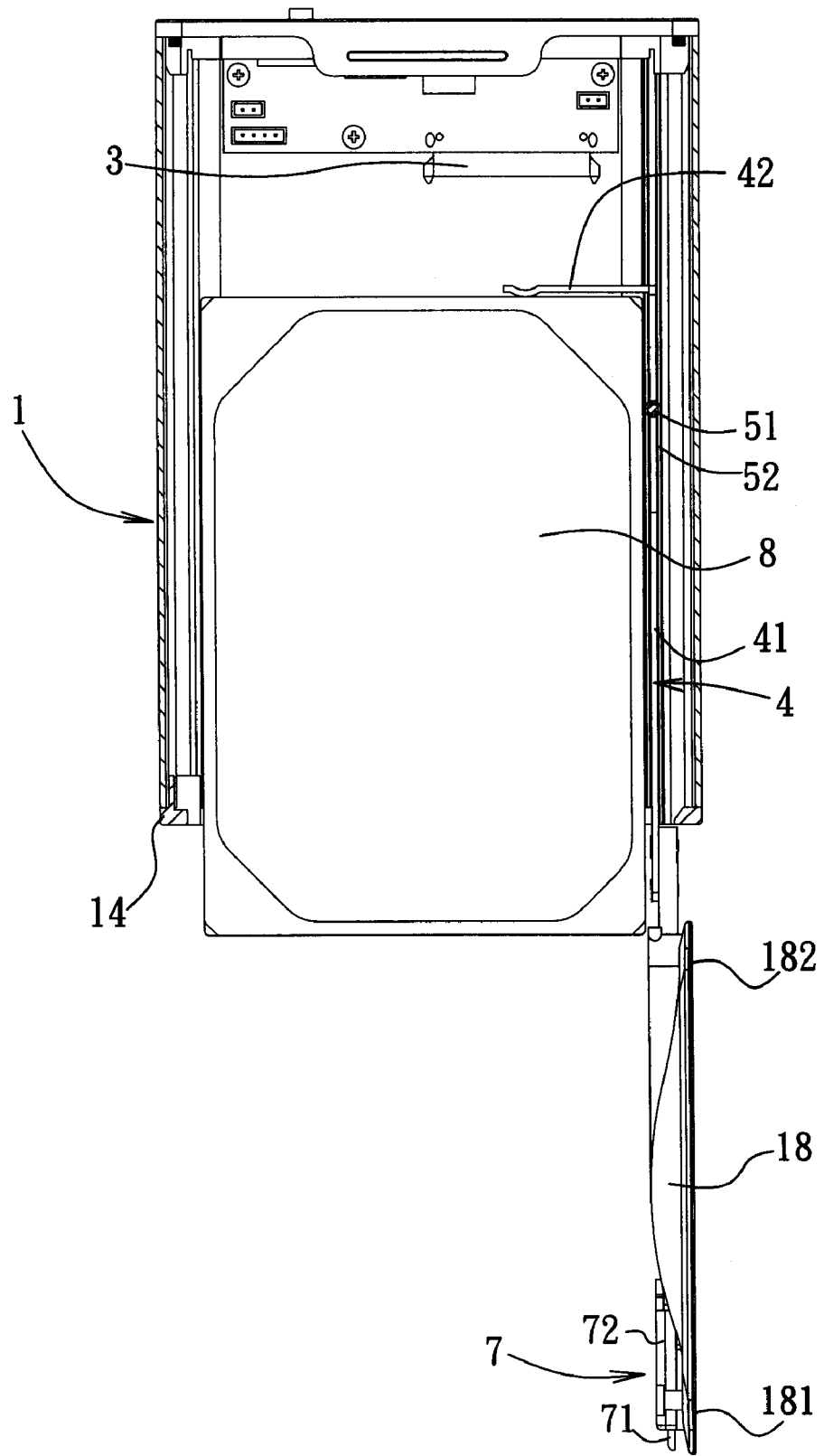

In use, when it is desired to install the storage device 8 in the casing unit 1, the storage device 8 is first partially inserted into the accommodating space 130 in the casing 13 through the front opening 10 in the frame 14. Then, the front cover 18 is moved from the open position to the closed position. During this operation, the resilient padding 6 pushes the entire storage device 8 into the accommodating space 130 in the casing 13 of the casing unit 1, as best shown in FIG. 5. Referring to FIGS. 6 and 7, when it is desired to remove the storage device 8 from casing unit 1, the front cover 18 is first moved from the closed position to the open position. During this operation, the pivot end portion 182 of the front cover 18 is brought to press against the frame 14 of the casing unit 1. This results in movement of the releasing unit 4 relative to the casing unit 1 in the longitudinal direction toward the second position, pushing of the storage device 8 by the pushing member 42, and disconnection of the terminal of the storage device 8 from the electrical connector 3, as best shown in FIG. 6. Thereafter, the front cover 18 is moved in the longitudinal direction away from the casing unit 1 so as to dispose the releasing unit 4 at the second position. During this operation, the pushing member 42 of the releasing unit 4 further pushes the storage device 8 such that the storage device 8 extends out of the casing unit 1 through the front opening 10 in the frame 14 of the casing unit 1, as best shown in FIG. 7.

The storage device box further includes a retaining unit 7 for retaining releasably the front cover 18 at the closed position. In this embodiment, the retaining unit 7 includes a movable member 71 that is provided on the free end portion 181 of the front cover 18, and a fixed member 72 that secures the movable member 71 on the free end portion 181 of the front cover 18. The movable member 71 is movable relative to the front cover 18 between a retaining position, where the movable member 71 engages the frame 14 of the casing unit 1, as best shown in FIG. 5, and a releasing position, where the movable member 71 is disengaged from the frame 14 of the casing unit 1.

The storage device box further includes a limiting unit for preventing movement of the releasing member 41 of the releasing unit 4 beyond the second position. In this embodiment, the limiting unit includes a first limiting member 52 that is disposed in the accommodating space 130 in the casing 13 of the casing unit 1 and that is provided on the releasing member 41 of the releasing unit 4, and a second limiting member 51 that is provided on the casing 13 of the casing unit 1 and that abut against the first limiting member 52 when the releasing member 41 of the releasing unit 4 is disposed at the second position. In this embodiment, the first limiting member 52 includes a recess-defining wall 521 that is formed on the releasing member 41 of the releasing unit 4 and that defines a recess 520. Further, in this embodiment, the second limiting member 51 includes a screw 511 that extends into the accommodating space 130 in the casing 13 of the casing unit 1 through the top wall of the casing 13 of the casing unit 1, and into the recess 520 in the releasing member 41 of the releasing unit 4. The construction as such permits the screw 511 of the second limiting member 51 to abut against the recess-defining wall 521 when the releasing unit 4 is disposed at the second position, thereby preventing the storage device 8 from dropping out of the storage device box of this embodiment before a user has a chance to grab onto the storage device 8. This also prevents the inadvertent removal of the releasing unit 4 from the casing unit 1.

The storage device box further includes a protective covering 17 that is provided on the top wall of the casing 13 of the casing unit 1. In this embodiment, the protective covering 17 is made from one of leather and metal.

Figure 8:
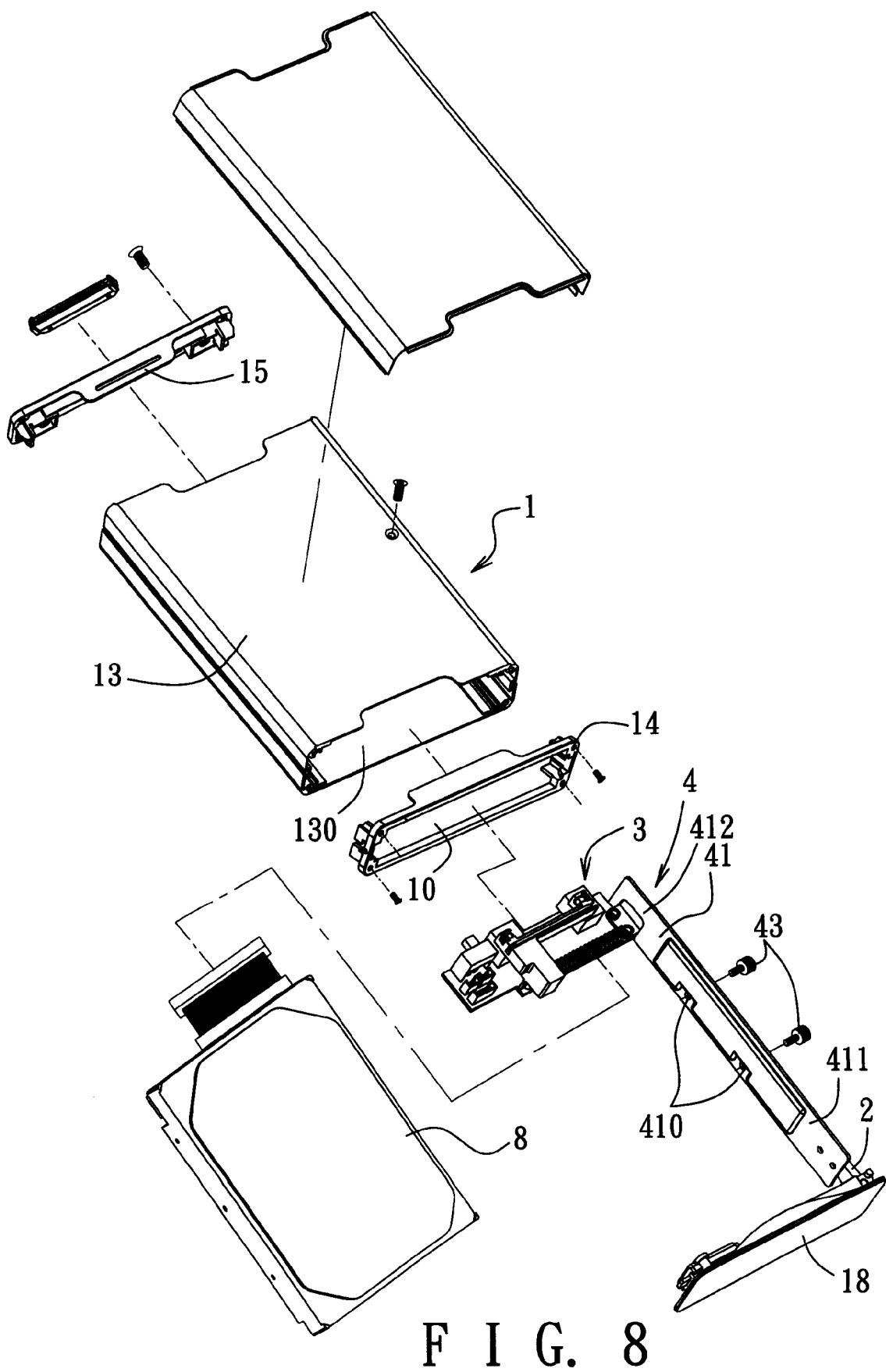
FIG. 8 is an exploded perspective view of the second preferred embodiment of a storage device box according to the present invention.

FIG. 8 illustrates the second preferred embodiment of a storage device box according to this invention. When compared to the previous embodiment, the releasing unit 4 is dispensed with the pushing member 42 (see FIG. 3.

The releasing member 41 of the releasing unit 4 is formed with a plurality of holes 410 therethrough.

The releasing unit 4 further includes a plurality of fastening members 43, each of which extends through a respective one of the holes 410 in the releasing member 41 and engages threadedly the storage device 8, thereby fastening the storage device 8 to the releasing member 41. In this embodiment, each of the fastening members 43 is a screw.

The electrical connector 3 is provided on the second end 412 of the releasing member 41 of the releasing unit 4, and connects electrically to the terminal of the storage device 8 when the storage device 8 is fastened to the releasing member 41.

In use, when it is desired to install the storage device 8 in the casing unit 1, the storage device 8 is first fastened to the releasing member 41 of the releasing unit 4. Then, the releasing unit 4, together with the storage device 8, is inserted into the accommodating space 130 in the casing 13 of the casing unit 1 through the front opening 10 in the frame 14 of the casing unit 1. Thereafter, the front cover 18 is disposed at the closed position. On the other hand, when it is desired to remove the storage device 8 from the casing unit 1, the aforementioned operation is simply performed in a reverse order.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A storage device box for mounting removably a storage device therein, comprising: a casing unit having front and rear openings that are opposite to each other in a longitudinal direction; a releasing unit extending movably into said casing unit through said front opening in said casing unit, and movable relative to said casing unit in the longitudinal direction; and a cover coupled pivotably to said releasing unit for covering and uncovering said front opening in said casing unit, and co-movable with said releasing unit relative to said casing unit in the longitudinal direction, said releasing unit including a releasing member that extends in a longitudinal direction, said cover being coupled pivotably to said releasing member, and a pushing member that is disposed in said casing unit, that is provided on said releasing member, and that extends in a direction transverse to the longitudinal direction, wherein said releasing unit is movable relative to said casing unit in the longitudinal direction between a first position, where said pushing member is disposed distal from said front opening in said casing unit, and a second position, where said pushing member is disposed proximate to said front opening in said casing unit, said storage device box further comprising a limiting unit for preventing movement of said releasing unit beyond the second position, said limiting unit including a first limiting member that is disposed in said casing unit and that is provided on said releasing member of said releasing unit, and a second limiting member that is provided on said casing unit, and that abuts against said first limiting member when said releasing unit is disposed at the second position.

2. The storage device box as claimed in claim 1, wherein said first limiting member includes a recess-defining wall that is formed on said releasing member and that defines a recess, and said second limiting member includes a screw that extends into said casing unit and said recess in said releasing member, and that abuts against said recess-defining wall when said releasing unit is disposed at the second position.

3. The storage device box as claimed in claim 1, wherein said pushing member has a protruding portion that protrudes toward said front opening in said casing unit.

4. The storage device box as claimed in claim 1, further comprising a guide rail disposed in said casing unit, provided on said casing unit, and defining a rail groove, said releasing unit being received slidably in said rail groove in said guide rail.

5. The storage device box as claimed in claim 1, further comprising a resilient padding provided on said cover, and extending into said front opening in said casing unit when said cover covers said front opening in said casing unit.

6. The storage device box as claimed in claim 1, further comprising a retaining unit including a movable member that is provided on said cover, and that is operable so as to engage and disengage said casing unit when said cover covers said front opening in said casing unit.

7. The storage device box as claimed in claim 1, further comprising a coupler coupled fixedly to said releasing unit, said cover being coupled pivotably to said releasing unit through said coupler.

8. The storage device box as claimed in claim 1, wherein the releasing unit includes a releasing member that extends in a longitudinal direction, said cover being coupled pivotably to said releasing member, and a fastening member that is provided on said releasing member and that is adapted to engage the storage device.

9. The storage device box as claimed in claim 1, further comprising a protective covering provided on said casing unit.

10. The storage device box as claimed in claim 9, wherein said protecting covering is made from one of leather and metal.

11. The storage device box as claimed in claim 1, further comprising: a rear cover mounted on said casing unit and covering said rear opening in said casing unit; and an electrical connector mounted on said rear cover, and adapted to be coupled electrically to a terminal of the storage device when the storage device is received in said casing unit.

12. The storage device box as claimed in claim 11, wherein said cover is disposed externally of said casing unit, and has a free end portion, and a pivot end portion that is opposite to said free end portion, that is coupled pivotably to said releasing member of said releasing unit, and that is brought to press against said casing unit when said cover uncovers said front opening in said casing unit, thereby resulting in movement of said pushing member in the longitudinal direction toward said front opening in said casing unit, pushing of the storage device by said pushing member, and disconnection of the terminal of the storage device from said electrical connector.

* * * * *